United States Patent
Kitagishi

[11] 4,206,976
[45] Jun. 10, 1980

[54] COMPACT TELEPHOTO LENS
[75] Inventor: Nozomu Kitagishi, Kawasaki, Japan
[73] Assignee: Canon Kabushiki Kaisha, Tokyo, Japan
[21] Appl. No.: 928,790
[22] Filed: Jul. 28, 1978
[30] Foreign Application Priority Data Aug. 2, 1977 [JP] Japan ................. 52-92729

[51] Int. Cl.² ............................................. G02B 9/60
[52] U.S. Cl. ........................................... 350/218
[58] Field of Search ....................... 350/176, 218
[56] References Cited
FOREIGN PATENT DOCUMENTS 478749 3/1972 Japan ........................ 350/218

*Primary Examiner*—Paul A. Sacher
*Attorney, Agent, or Firm*—Toren, McGeady and Stanger

[57] ABSTRACT

A five component Ernostar type telephoto lens having a focal length in the intermediate order up to 135 m/m with a telephoto effect down to 0.84 but with limitation of zonal spherical aberration to a minimum is disclosed. The lens system comprises, from front to rear, a biconvex lens having a far larger front curvature than that of a rear surface thereof, a forwardly convex positive meniscus lens, a negative doublet composed of a forwardly concave front positive meniscus lens element and a rear biconcave lens element and followed, after a large axial air separation, by a negative meniscus lens of forward concavity, and a biconvex lens. The system fulfills the following requirements:

$$\frac{1.5}{F} < \phi1 < \frac{2.5}{F}$$

$$\frac{-0.15}{F} < \phi4,5 < \frac{0.41}{F}$$

0.3F < |R6| < 0.5F where in R6 < 0 where F is the focal length of the entire system; $\phi1$ is the focal length of the first biconvex lens; $\phi4,5$ is the composite focal length of the last two lenses; and R6 is the radius of curvature of the cemented surface in the doublet.

3 Claims, 16 Drawing Figures

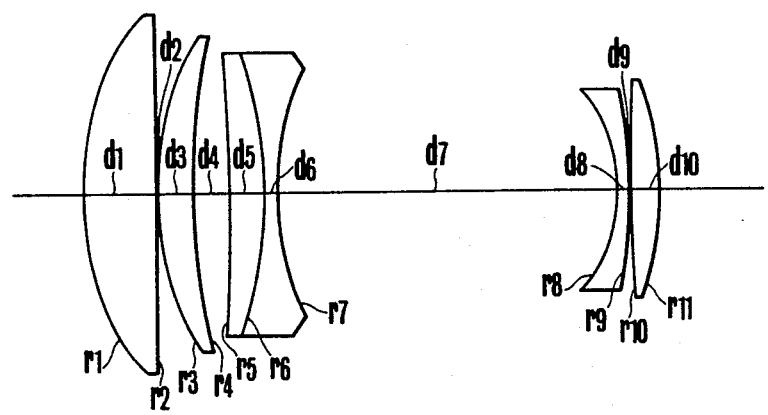
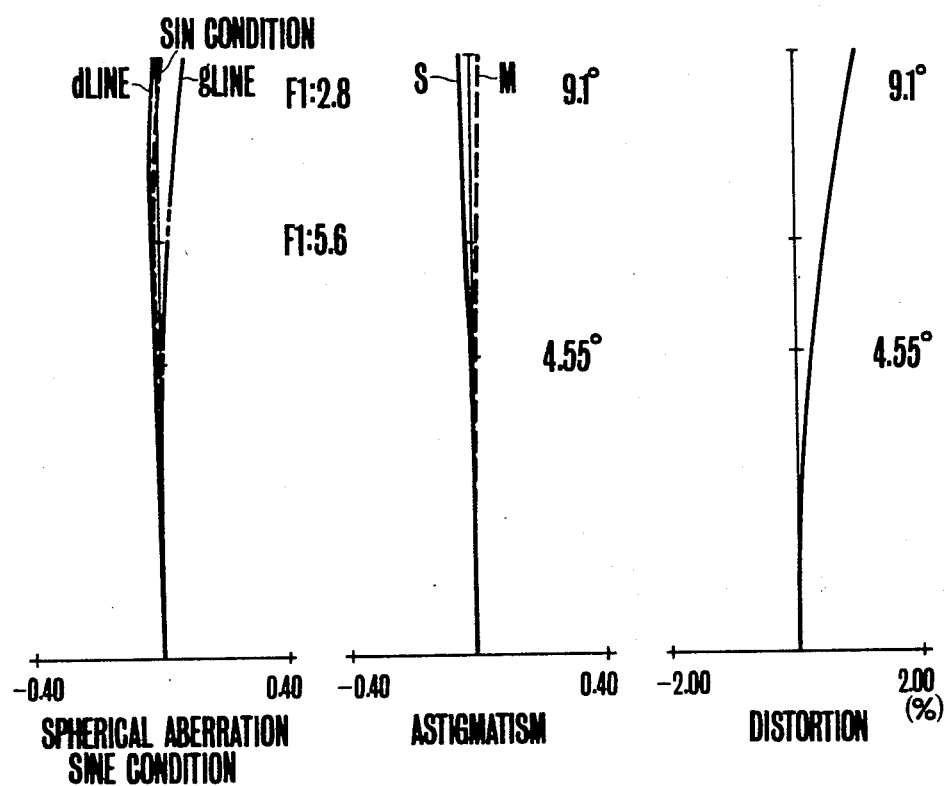

COMPACT TELEPHOTO LENS

BACKGROUND OF THE INVENTION

This invention relates to telephoto lenses, and more particularly to a highly corrected Ernostar type lens.

Recently, from the standpoint of easy management with less stress on photographic performance, there has been a demand for compactness of photographic lenses. This demand is particularly acute in the field of intermediate telephoto lenses of focal lengths on the order of 100 to 150 m/m, because they are suited for many photographic applications such as portrait photography.

The Ernostar lens is prominent around the types of telephoto lenses adapted to have focal lengths within this range. An Ernostar type lens provides for compactness with an increase in relative aperture. However, difficult problems arise in that the zonal spherical aberration tends to increase along with the Petzval sum in the negative sense, and that the spherical aberration for light rays of shorter wave lengths than the design wave length is extremely over-corrected. This results in production of some flare in the picture image.

To reduce the physical length of a five component Ernostar type telephoto lens, the refractive power of the first component counting from the front is usually increased, the axial distance between the front surface of the first component and the rear surface of the third component is elongated, and the refractive power of the third component is increased. As has been stated above, however, this results in an unavoidable increase in the zonal spherical aberration as the refractive power of the first component increases, and an increase in the Petzval sum in the negative sense as the above-defined distance increases. In addition thereto, since the third component has a large chromatic dispersion for the purpose of chromatic correction, the increase in the absolute refractive power of the negative third component leads to a large increase in over-correction of spherical aberration for the shorter wave length light rays.

Japanese Patent Publication No. Sho 49-23771 issued 1974 to the assignee of the present invention discloses an example of an Ernostar type telephoto lens designed to have a telephoto effect of 0.98, that is the length of the entire system from front vertex to film plane which is equal to 0.98 times the focal length of the system, with a F-number of 1:2.5 and an image angle of 18.2°. It is now found that the lens described in this patent leaves room for improvements of further shortening of the physical length and of correction of spherical aberration. Another example of a recently developed Ernostar type lens is described in U.S. Pat. No. 4,057,330.

SUMMARY OF THE INVENTION:

It is a general object of the present invention to provide a telephoto lens which is greatly shortened along its optical axis while nevertheless permitting the various aberrations to be corrected.

An object of the present invention is to provide a compact Ernostar type telephoto lens.

Another object of the present invention is to provide a lens of the character described which is well corrected for zonal spherical aberration and of which the Petzval sum is limited to a minimum.

Still another object of the present invention is to provide a lens of the character described which is free from otherwise over-corrected spherical aberration and under-corrected coma for light rays of wave lengths shorter than the design wave length.

To achieve these objects, according to an aspect of the present invention applied to a five component Ernostar type telephoto lens, the fourth and fifth components counting from front which are preceded in a large axial separation by the third component are provided with a composite focal length sufficiently small that, whilst the longitudinal length of the system is maintained reduced, the refractive power of the first component may be decreased as the axial distance between the front surface of the first component and the rear surface of the third component is shortened. This makes it possible to achieve good correction of zonal spherical aberration and Petzval sum.

For the over-corrected residual of spherical aberration for light rays of shorter wave lengths, it is important to provide the third component with a surface acting strongly on the marginal axial rays of which the wave lengths falls in the shorter region. Thus the flare which is due to such residual aberration is removed over the entire area of the format so that good reproduction of contrast differences of a sense to be photographed can be obtained.

The foregoing and other objects, features and advantages of the present invention will be apparent from the following detailed description taken in conjunction with the accompanying drawings in which:

BRIEF DESCRIPTION OF THE DRAWINGS:

FIG. 1 is an axial sectional view of a first example of a specific telephoto lens embodying the present invention.

FIGS. 2A to 2C are graphic representations of the spherical aberrations for two different spectral lines with since condition, astigmatism and distortion, respectively, of the lens of FIG. 1 with object at infinity.

Figure 3:
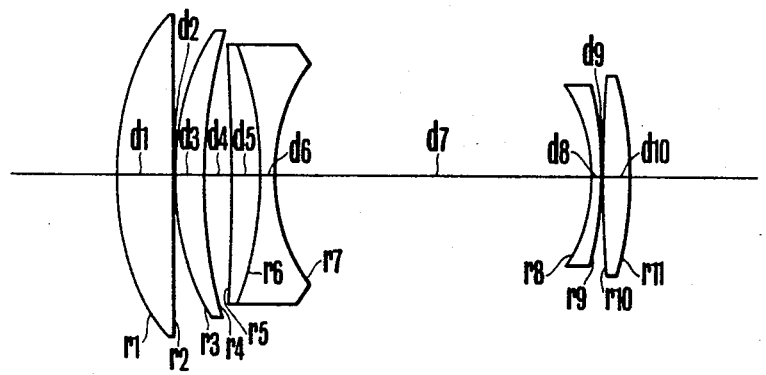
FIG. 3 is an axial sectional view of a second example of the telephoto lens of the invention.
Figures 4A, 4B, 4C:
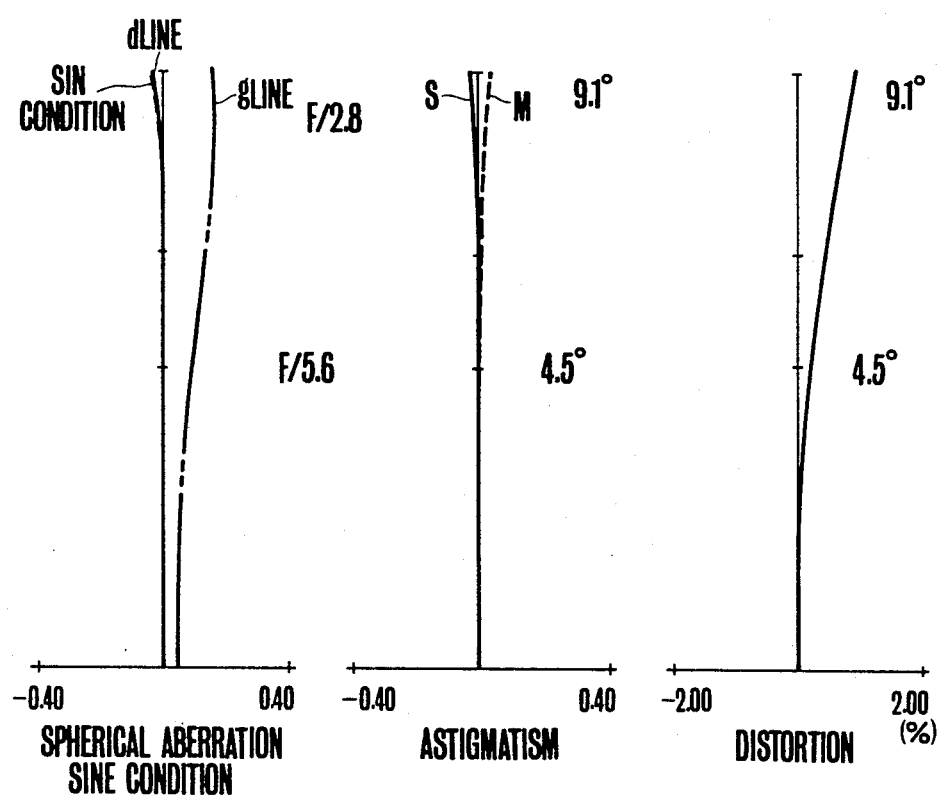
FIGS. 4A to 4C are graphic representations of the aberrations of the lens of FIG. 3 with object at infinity.
Figure 5:
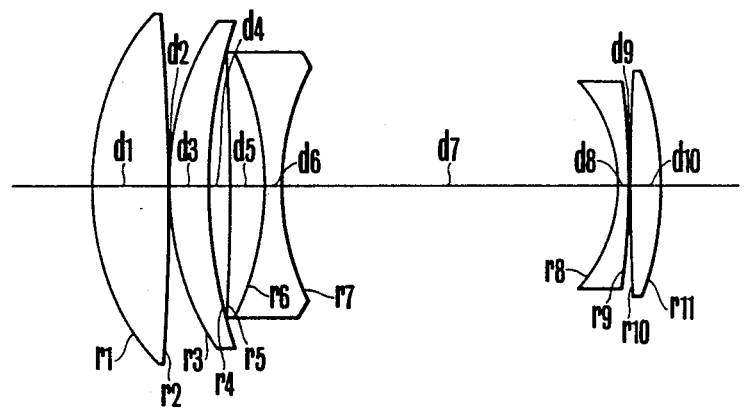
FIG. 5 is an axial sectional view of a third example of the telephoto lens of the invention.
Figures 6A, 6B, 6C:
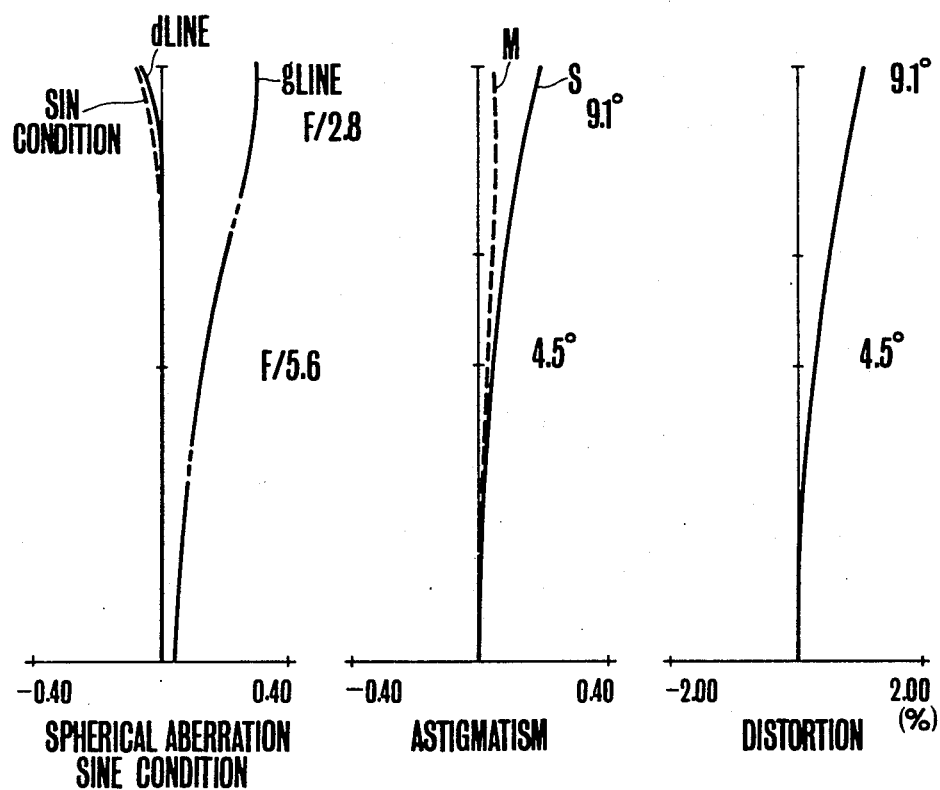
FIGS. 6A to 6C are graphic representations of the aberrations of the lens of FIG. 5 with object at infinity.
Figure 7:
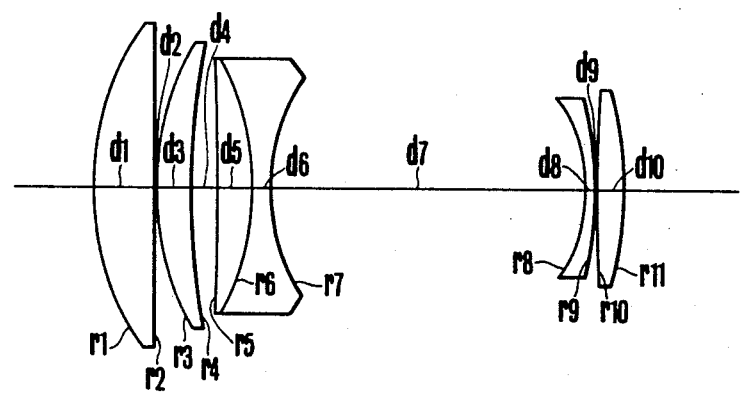
FIG. 7 is an axial sectional view of a fourth example of the telephoto lens of the invention.
Figures 8A, 8B, 8C:
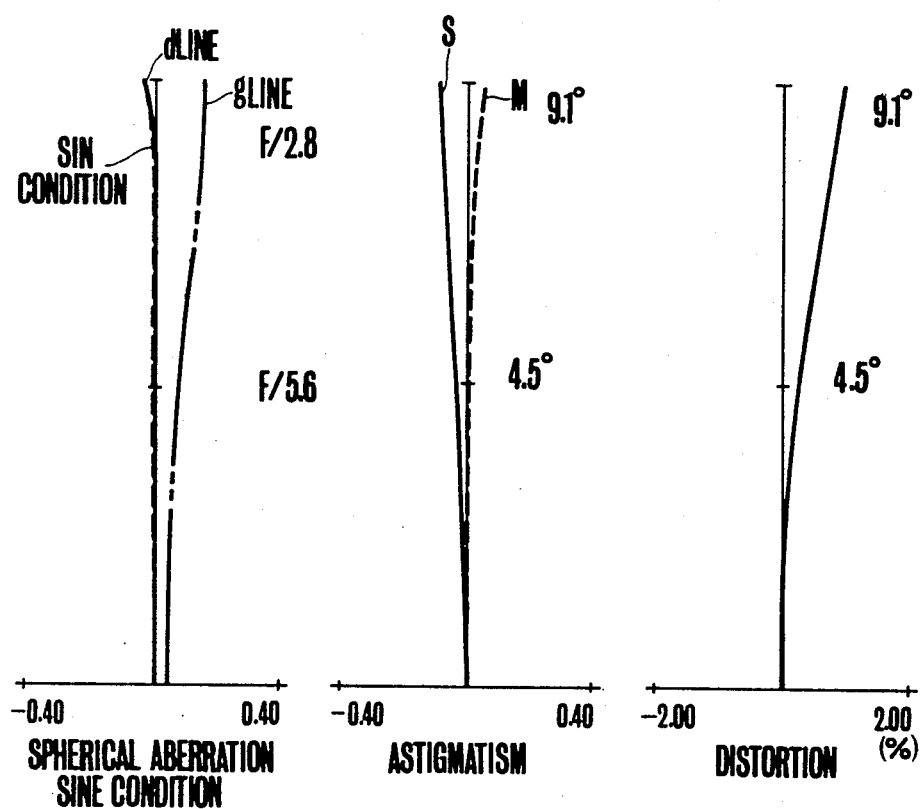
FIGS. 8A to 8C are graphic representations of the aberrations of the lens of FIG. 7 with object at infinity.

DESCRIPTION OF THE PREFERRED EMBODIMENTS:

Referring to FIGS. 1, 3, 5 and 7, show four examples of embodiments of the present invention each comprising five elements optically aligned on a common axis. The first component is a biconvex lens with a front surface, r1, having a smaller radius of curvature in absolute value than that of a rear surface, r2, thereof. The second component is a positive meniscus lens of forward convexity with front and rear surfaces, r3, and, r4, respectively. The third component is a negative doublet lens with front and rear surfaces, r5, and r7, respectively, consisting of a front positive and a rear negative lens cemented at their adjoining surfaces, r6. This cemented surface, r6, is convex toward the rear. The fourth component which is disposed in a large axial separation from the third component is a negative meniscus lens of forward concavity with front and rear surfaces, r8, and, r9, respectively. The fifth component is a positive or biconvex lens with a front surface, r10, having a larger radius of curvature than that of a rear surface, r11, thereof.

The telephoto lens of the invention fulfills at least one of the following requirements:

$$\frac{1.5}{F} < \phi1 < \frac{2.5}{F} \quad (1)$$

(2) $0.15F < d1+d2+d3+d4+d5+d6 < 0.25F$ $$\frac{-0.15}{F} < \phi4,5 < \frac{0.41}{F} \quad (3)$$

(4) $0 < n3-n4 < 0.06$ (5) $0 < \nu4 = \nu3 < 3$ (6) $0.3F < |R6| < 0.5F$ wherein $R6 < 0$ where F is the focal length of the entire system; $\phi1$ is the refractive power of the first component; $\phi4,5$ is the combined refractive power of the fourth and fifth components; $d_i$ is the i-th axial separation between the successive two surfaces counting from the front; n3 and $\nu3$ are the refractive index and Abbe number of the front positive lens in the doubler respectively; n4 and $\nu4$ are the refractive index and Abbe number of the rear negative lens in the doublet respectively; and R6 is the radius of curvature of the cemented surface.

Requirement (1) represents the condition for achieving compactness of the lens system while still maintaining the zonal spherical aberration and Petzval sum at a minimum. In conventional Ernostar type lenses the condition that the telephoto effect of the lens system be reduced to a value desired of the present invention would make prominent the tendency of the Petzval sum to increase a large negative value quite prominent. To avoid this tendency from becoming serious, according to the present invention, the upper limit of the unequality (1) is set forth. The zonal spherical aberration also becomes serious when the upper limit is exceeded. When lower limit is exceeded, the compactness is difficult to attain.

The factor (2) indicates the axial distance between the front surface of the first component and the rear surface of the third component. When the upper limit is exceeded, the lens system is advantageously shortened along the optical axis, but a large negative Petzval sum is introduced.

The requirement (3) represents the distribution of refractive power of the rear group of the last two or fourth and fifth components for assistance in achieving good correction of coma and distortion in the compact lens system. When the lower limit is exceeded, a large residual of coma and distortion is introduced, though the longitudinal length of the lens system can be advantageously shortened. Conversely when the upper limit is exceeded, the coma and distortion can be advantageously corrected, but a long lens results.

Within the framework of the above mentioned features (1), (2) and (3), the various aberrations now having about minimum values provided for light rays of the design wave lengths, the invention also removes the residual of spherical aberration and coma for the other wave lengths which may cause reduction of the image quality by flare. This is achieved by incorporating the doublet as set forth in the requirements (4), (5) and (6). When the upper limits of the unequalities (4) and (5) are exceeded, an advantage can be taken of good correction of spherical aberration for the light rays of shorter wave lengths, but coma for the shorter wave length region is over-corrected to a permissible level. Conversely when the lower limits are exceeded, the cemented surface produces little effect on the adjustment of aberrations, and, in some cases, acts to promote production of large aberrations. The factor (6) indicates the radius of curvature of this cemented surface. When the upper limit is exceeded, the forwardly concave form of the cemented surface loses its capability of performing significant functions. When the lower limit is exceeded, over-correction of coma results at the shorter wave length region.

In the course of development of the telephoto lens of the present invention, it has been proven that the decrease in the longitudinal length of the front group of the first three components is advantageous to facilitate minimization of the weight of the entire lens system provided that the thicknesses of these three components are correspondingly decreased. By this reduction of the weight and bulk of the telephoto lens, the easy management with less stress has been realized.

The four examples of specific lens systems represented in FIGS. 1, 3, 5 and 7 can be constructed in accordance with the numerical data given in Tables 1 to 4 respectively for the radii, r1 to r11, the lens thicknesses an axial separtions, d1 to d10, along with the indices of refraction n1 to n6, for the spectral d line of sodium and the Abbe numbers, $\nu1$ to $\nu6$ of the various lens elements. The minimum values of the radii indicate surfaces concave toward the front. The total length is measured from the front vertex to the film plane. In the lower section of Table 1, there are listed spherical aberration coefficients SA, coma coefficients CM, astigmatism coefficients AS, Petzval sum PT and distortion coefficients DS for the various refracting surfaces.

Table 1

F = 100 f/2.8 2ω = 18.2° Total length = 88.27

| Radii | | Thickness and Axial Separation | | Refraction | | Abbe Numbers | |
|---|---|---|---|---|---|---|---|
| r1 | 33.044 | d1 | 7.407 | n1 | 1.60311 | ν1 | 60.7 |
| r2 | −781.549 | d2 | 0.148 | | | | |
| r3 | 35.733 | d3 | 3.630 | n2 | 1.60311 | ν2 | 60.7 |
| r4 | 76.408 | d4 | 3.578 | | | | |
| r5 | −235.514 | d5 | 3.710 | n3 | 1.80518 | ν3 | 25.4 |
| r6 | −48.914 | d6 | 1.259 | n4 | 1.74000 | ν4 | 28.3 |
| r7 | 31.264 | d7 | 34.133 | | | | |
| r8 | −17.475 | d8 | 1.259 | n5 | 1.60311 | ν5 | 60.7 |
| r9 | −43.146 | d9 | 0.148 | | | | |
| r10 | 515.879 | d10 | 2.963 | n6 | 1.72342 | ν6 | 38.0 |
| r11 | −39.746 | | | | | | |

Table 2

F = 100 f/2.8 2ω = 18.2° Total length = 87.89

| r1 | 32.372 | d1 | 6.667 | n1 | 1.62299 | ν1 | 58.20 |
|---|---|---|---|---|---|---|---|
| r2 | −1211.575 | d2 | 0.148 | | | | |
| r3 | 31.125 | d3 | 3.758 | n2 | 1.60311 | ν2 | 60.70 |
| r4 | 74.009 | d4 | 2.877 | | | | |
| r5 | −398.593 | d5 | 3.183 | n3 | 1.76180 | ν3 | 27.10 |
| r6 | −44.266 | d6 | 1.547 | n4 | 1.71736 | ν4 | 29.50 |
| r7 | 23.670 | d7 | 35.435 | | | | |
| r8 | −18.849 | d8 | 1.111 | n5 | 1.60311 | ν5 | 60.70 |
| r9 | −44.975 | d9 | 0.222 | | | | |
| r10 | 679.225 | d10 | 2.963 | n6 | 1.72342 | ν6 | 38.00 |
| r11 | −39.824 | | | | | | |

Table 3

F = 100 f/2.8 2ω = 18.2° Total length = 84.07

| r1 | 29.916 | d1 | 7.407 | n1 | 1.62299 | ν1 | 58.2 |

Table 3-continued

| | F = 100 f/2.8 2ω = 18.2° Total length = 84.07 | | | | | | |
|---|---|---|---|---|---|---|---|
| r2 | −297.148 | d2 | 0.148 | | | | |
| r3 | 31.813 | d3 | 4.046 | n2 | 1.60311 | ν2 | 60.7 |
| r4 | 61.181 | d4 | 1.945 | | | | |
| r5 | −171.956 | d5 | 3.187 | n3 | 1.74 | ν3 | 28.3 |
| r6 | −33.602 | d6 | 1.646 | n4 | 1.71736 | ν4 | 29.5 |
| r7 | 26.162 | d7 | 33.151 | | | | |
| r8 | −16.207 | d8 | 1.271 | n5 | 1.60311 | ν5 | 60.7 |
| r9 | −54.040 | d9 | 0.222 | | | | |
| r10 | 498.142 | d10 | 2.963 | n6 | 1.72342 | ν6 | 38. |
| R11 | −34.059 | | | | | | |

Table 4

| | F = 100 f/2.8 2ω = 18.2° Total length = 90.02 | | | | | | |
|---|---|---|---|---|---|---|---|
| r1 | 34.308 | d1 | 6.667 | n1 | 1.62299 | ν1 | 58.2 |
| r2 | −1540.609 | d2 | 0.37 | | | | |
| r3 | 34.193 | d3 | 3.625 | n2 | 1.60311 | ν2 | 60.7 |
| r4 | 84.567 | d4 | 3.382 | | | | |
| r5 | −356.837 | d5 | 3.552 | n3 | 1.74 | ν3 | 28.3 |
| r6 | −36.113 | d6 | 2.26 | n4 | 1.71736 | ν4 | 29.5 |
| r7 | 25.413 | d7 | 35.583 | | | | |
| r8 | −20.021 | d8 | 1.111 | n5 | 1.60311 | ν5 | 60.7 |
| r9 | −39.059 | d9 | 0.222 | | | | |
| r10 | 450.437 | d10 | 2.963 | n6 | 1.72342 | ν6 | 38. |
| r11 | (t) −45.707 | | | | | | |

What is claimed is:

1. A compact telephoto lens comprising:
    a first lens of positive power having a rear surface and a front surface with its front surface having a larger curvature than its rear surface;
    a second lens arranged to the rear of said first lens and having a positive power in a forwardly convex meniscus form;
    a third lens arranged to the rear of said second lens and consisting of a negative doublet lens composed of a positive lens and a biconcave lens cemented together in this order from the front;
    a fourth lens arranged to the rear of said third lens by a large air space and having a negative power in a forwardly concave meniscus form; and
    a fifth lens of positive power having a rear surface and a front surface with the rear surface having a larger curvature than the front surface, said telephoto lens satisfying the following conditions:

$$\frac{1.5}{F} < \phi 1 < \frac{2.5}{F}$$

$$0.15F < d1+d2+d3+d4+d5+d6 < 0.25F$$

$$\frac{-0.15}{F} < \phi 4,5 < \frac{0.41}{F}$$

where F is the focal length of the entire lens system; $\phi 1$ is the refractive power of the first lens; $\phi 4,5$ is the composite refractive power of the fourth and fifth lenses; and d are the axial thicknesses of the first three lenses and the axial air separations therebetween.

2. A telephoto lens according to claim 1, wherein said first lens is a biconvex lens, said third lens is a negative doublet lens composed of a forwardly concave positive meniscus lens and a biconvex lens and said fifth lens is a biconvex lens, said telephoto lens satisfying the condition $$0.3F < |R6| < 0.5F, \text{ where } R6 < 0$$

where R6 is the radius of curvature of the cemented surface in said doublet.

3. A telephoto lens according to claim 2, further satisfying the following conditions $$0 < n3 - n4 < 0.06$$

$$0 < \nu 4 - \nu 3 < 3$$

wherein n3 and ν3 are the refractive index and the Abbe number of the positive meniscus lens in the doublet; and n4 and ν4 are the refractive index and the Abbe number of the biconcave lens in the doublet.

* * * * *